(12) United States Patent
Falco et al.

(10) Patent No.: US 6,501,733 B1
(45) Date of Patent: Dec. 31, 2002

(54) METHOD FOR CONTROLLING DATA FLOW ASSOCIATED WITH A COMMUNICATIONS NODE

(75) Inventors: Steven Anthony Falco, Morris Plains, NJ (US); Stephen Gregory Strickland, Holmdel, NJ (US); Ming-Hsu Tu, Somerset, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/411,007

(22) Filed: Oct. 1, 1999

(51) Int. Cl.[7] .................. G01R 31/08; H04L 12/54; H04M 3/00
(52) U.S. Cl. .................. 370/235; 370/429; 379/266.01
(58) Field of Search ................... 370/229, 230, 370/235, 252, 253, 363, 368, 371, 374, 378, 381, 395.72, 395.71, 412, 413, 428, 429; 379/266.01, 266.02, 266.03, 266.05, 266.06

(56) References Cited

U.S. PATENT DOCUMENTS

| | | | |
|---|---|---|---|
| 5,097,499 A | | 3/1992 | Cosentino |
| 5,506,898 A | * | 4/1996 | Costantini et al. .......... 379/266 |
| 5,528,513 A | | 6/1996 | Vaitzblit et al. |
| 5,905,793 A | * | 5/1999 | Flockhart et al. ........... 379/266 |
| 5,982,873 A | * | 11/1999 | Flockhart et al. ........... 379/266 |

* cited by examiner

Primary Examiner—Wellington Chin
Assistant Examiner—Brenda Pham
(74) Attorney, Agent, or Firm—Harness, Dickey & Pierce, P.L.C.

(57) ABSTRACT

A communications node predicts a transmission-departure time of a receive data message from an output upon reception of the receive data message at an input of the communications node. The communications node determines if the receive data message would remain stored within the communications node for a latent duration longer than a waiting-time limit based on the predicted transmission-departure time. The communications node admits the receive data message, for storage in a buffer memory of the communications node for prospective transmission over the output, if the receive data message would be transmitted prior to expiration of the waiting-time limit.

15 Claims, 3 Drawing Sheets

METHOD FOR CONTROLLING DATA FLOW ASSOCIATED WITH A COMMUNICATIONS NODE

FIELD OF THE INVENTION

This invention relates to a method for controlling data flow associated with a communications node; more specifically a communications node that services a wireless communications system.

BACKGROUND

A communications node is a computer or another network element that communicates with a communications network. A communications node may be configured to control store-and-forward operations between an input and an output of the communications node. In particular, the communications node may manage buffer memory to control store-and-forward operations. The management of the buffer memory may include an admission control approach for admitting data messages with time-out constraints. A time-out constraint provides an indication of the freshness or staleness of a data message stored in the communications node. A time-out constraint defines a maximum desired time difference between admittance of the data message to buffer memory and the transmittance of the data message from the buffer memory.

Some admission control approaches waste buffer memory resources. For example, if data messages are admitted whenever storage space is available in the buffer memory, the communications node will sometimes waste storage space by admitting a data message which cannot be forwarded within its time-out constraint. Further, the storage space occupied by the held data message blocks prevents other messages from entering the buffer memory for a duration exceeding the time-out constraint of the held data message, reducing space available for other data messages which could meet their time-out constraints.

Some communication nodes may be fortified with supplemental buffer memory in an attempt to compensate for the foregoing inefficiencies in the management of the buffer memory. However, the cost of a communications node generally increases with the complexity and quantity of buffer memory. The communications nodes may suffer reduced throughput because their memory capacity can not be expanded beyond a limit. Thus, a need exists for managing admission priority of data messages to reduce buffer memory requirements or to enhance throughput performance.

SUMMARY OF THE INVENTION

In accordance with the invention, a method for controlling data flow in a store-and-forward communication node includes deciding whether to grant or deny admission of data messages to the communications node. In the context of granting admission of data messages to the communications node, the communications node may use a zero loss approach or a variant of the zero-loss approach. In the zero-loss approach, an overload controller of the communications node predicts a transmission-departure time of a receive data message from an output upon reception of the receive data message at an input of the communications node. The overload controller determines if the receive data message would remain stored within the communications node for a latent duration longer than a waiting-time limit based on the predicted transmission-departure time. The receive data message is admitted if the receive data message would be transmitted prior to expiration of the waiting-time limit, or according to another suitable criterion. The overload controller cooperates with a processing system to admit the receive data message for storage in a buffer memory of the communications node for prospective transmission over the output. The foregoing zero-loss approach and variants thereof are well-suited for reducing handling time per data message and total memory capacity required to service an anticipated load of data messages at the communications node.

DETAILED DESCRIPTION

Figure 1:
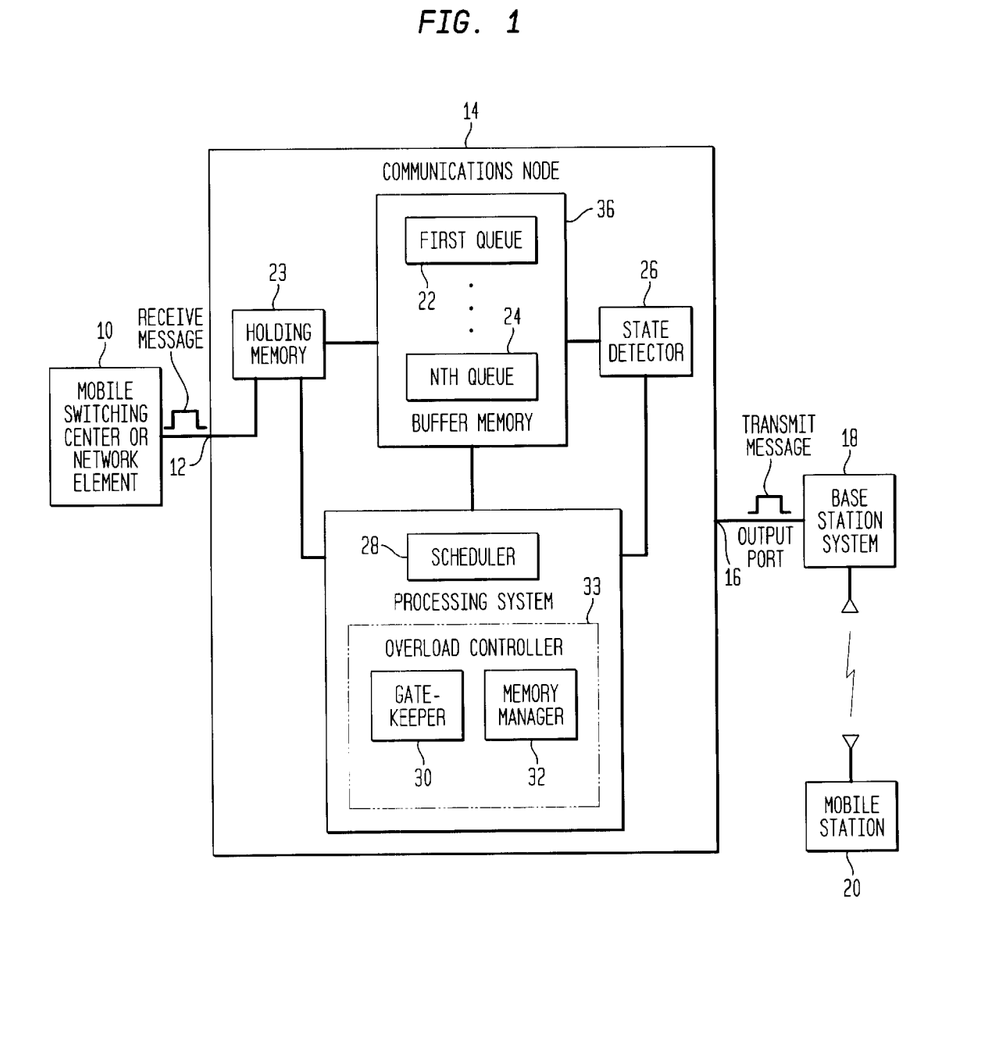
FIG. 1 is a block diagram of a wireless communications system that includes a communication node in accordance with the invention.

In accordance with the invention, FIG. 1 shows a store-and-forward communications node 14 that receives receive data messages from a mobile switching center 10, or another network element at an input 12. If the receive data messages are accepted in accordance with an admission priority scheme, the store-and-forward communications node 14 stores the receive data messages in a buffer memory 36. The buffer memory 36 is logically organized into a group of queues, ranging from a first queue 22 to an nth queue 24. The communications node 14 selects receive data messages from one or more queues to be transmitted as transmit data messages in accordance with a transmission priority scheme. In a preferred embodiment, the output 16 of the store-and-forward communications node 14 is coupled to a base station transmitter for a downlink transmission to one or more mobile stations 20. Although the communications node 14 is shown coupled between the mobile switching center 10 and the base station 18, in an alternate embodiment the communications node may be integrated with a mobile switching center or a base station system.

The communications node 14 includes a processing system 34 coupled to a holding memory 23, a buffer memory 36, and a state detector 26. The processing system 34 hosts a scheduler 28 for managing the transmission priority scheme and an overload controller 33 for handling an admission priority scheme. In practice, a store-and-forward communications node 14 may comprise a router, such as an enhanced digital radio unit (EDRU) for a digital wireless communications system with a priority-based admission and scheduling scheme. The state detector 26 monitors, or otherwise detects, occupancy rate states of the buffer memory 36 or at least one queue within the buffer memory 36. For example, the state detector 26 may measure an occupancy state rate of each active (i.e., partially or completely filled) queue on a regular or periodic basis. The state detector 26 is configured to communicate occupancy rate states with the processing system 34.

The overload controller 33 may include an gatekeeper 30, a memory manager 32, or both. The gatekeeper 30 controls the admittance of a receive data message to the buffer memory 36 of the store-and-forward communications node 14 from the holding memory 23 based on a status of the buffer memory 36. For example, if the buffer memory 36 is full, the gatekeeper 30 may refuse to admit a receive data message to the buffer memory 36 for processing. If the buffer memory 36 is not full, the gatekeeper 30 may admit the receive data message for processing or storage by the communications node 14. Further, the gatekeeper 30 executes additional conditions, imposed by the processing system 34, for admittance into the buffer memory 36.

The memory manager 32 may delete an existing message in the buffer memory 36 to make room for a more recent receive data message currently at the input 12 of the communications node 14. Ideally, the average arrival rate of receive data messages at the input 12 of the communications node 14 is less than or equal to the average output 16 rate of corresponding transmit data messages associated with the receive data messages such that deletion of data messages is not necessary. However, the transient or average arrival rate may be greater than the average output rate of the data messages such that the deletion of one or more data messages may become a practical necessity.

In an alternate embodiment, the buffer memory manager 32 makes preemptive deletions of data messages where existing data messages in the buffer memory 36 are deleted before a queue fills. For example, the buffer memory manager 32 may establish preemptive deletions to preserve space for "important" messages and/or simplify processing. The preservation of such space can be configured to meet anticipated demand during peak busy periods. Although the queues may have static maximum sizes, dynamic maximum sizes are preferable to enhance the flexibility of the memory management. The communications node 14 may configure dynamic maximum queue lengths on demand to cover the ongoing traffic patterns of data messages through the communications node 14, rather than fixing static maximum queue lengths based on a potentially arbitrary prediction of actual traffic patterns.

Depending on the performance measures of interest and constraints on complexity, the overload controller 33 may entail a wide variety of admission control algorithms, overload control algorithms, or both. The gatekeeper 30 includes a "zero loss" admission control algorithm or a variant of the zero loss admission control algorithm. Under the direction of an admission control algorithm or an overload control algorithm of the invention, the overload controller 33 facilitates the efficient use of the buffer memory 36. Further, the overload controller 33 manages the allocation of the existing buffer memory 36 to satisfy throughput demands under specified time constraints.

The store-and-forward communications node 14 may transmit the stored data messages from the buffer memory 36 as transmit data messages on the downlink channel to a mobile station 20. Because the receive data message may have different characteristics than the transmit data message and because of transmission limitations of the air interface, the communications node 14 may store, buffer, or otherwise process the receive data message before transmitting the receive data message over the airlink as a transmit data message.

The processing system 34 may format or structure the receive or stored data message into a format as a transmit data message that is compatible for transmission over a downlink channel to the mobile stations 20. The data messages may be transmitted over any type of communications channel, including a voice, data, or control channel. For example, in the context of a time division multiple access system (TDMA), the processing system 34 may facilitate the transmission of transmit data messages over a downlink digital control channel (DCCH ) and a subchannel (e.g., short messaging service/ paging channel (SPACH)) of the digital control channel. The SPACH provides channel assignments over a downlink signal and may support one-way or two-way short messaging service. The DCCH airlink protocol over a TDMA system provides a maximum number of time slots (e.g., 21) in each superframe interval (e.g., 640 millisecond interval) for transmitting a data message.

Although the communications node 14 can readily predict a transmission departure time for a receive data message where the communications node 14 communicates to a downstream TDMA wireless system, other wireless communication systems (e.g., Global System for Mobile Communications (GSM) or code-division, multiple-access systems) may use the system and method for controlling data flow; hence, fall within the scope of the invention.

The scheduler 28 assigns transmit priorities to receive data messages waiting in the buffer memory 36 for transmission as transmit data messages. Although the scheduler 28 may use any type of priority scheme for the data messages, in one example the scheduler 28 assigns receive data messages transmission priorities based on graduated priority rules that vary with different occupancy rates of the queues (22, 24). The occupancy rates of the queues (22, 24) are provided by the state detector 26.

Graduated priority rules encompass schemes, for example, where as the occupancy rates of queues in the buffer memory 36 increase, the assignment of transmission priorities for newly received messages may vary from the previously received messages. Transmission priorities could be assigned such that only critical data messages receive high transmission priorities, while all other data messages receive artificially low transmission priorities by comparison to previously or historically received messages. Critical data messages may be data messages related to public safety, emergency operations, "911" systems, or the like.

A transmission priority scheme refers to a fixed ranking of the queues associated with the time slot. Each queue may represent a certain overall transmission priority level that is consistent with the contributing transmission priority levels of one or more time slots serving the queue. The processing system 34 examines the queues in their order of their overall transmission priority and the scheduler 28 selects the first message in the first non-empty queue. Thereafter, the second message in the first non-empty queue is selected until all the messages in the first-non-empty queue have been sent. Subsequently, the scheduler 28 examines the second non-empty queue and selects the first message in the second non-empty queue and so on.

The scheduler 28 only assigns transmit priorities to data messages where more than one message is waiting in the buffer memory 36 or a given queue. If only one receive data message is waiting in a buffer memory 36 or an active queue, no judgment on transmit priority needs to be made and the single receive data message may be transmitted immediately or when the next transmit opportunity arises. A superframe for transmission from the communications node may contain special-purpose time slots and all purpose time-slots. The special service time-slots are restricted to serving some subset of the queues, whereas the general purpose time slots serve any of the queues.

For TDMA applications of the communications node 14, a precise understanding of transmit opportunities for the transmit data messages requires knowledge of the DCCH downlink operation. Under current TDMA standards, for example, during every superframe interval duration (e.g., 640 millisecond interval), the communications node 14 has a maximum number (e.g., 21) of time slots in which it can send messages. For reasons of battery conservation, mobiles typically "sleep" (power down) during all but one of these slots; this "listening" time slot for each mobile is randomly assigned among the first group of time slots (.e.g., 19) within the superframe interval so as to evenly distribute the mobiles. The initial communication with a mobile to set up a voice or data transmission must occur in this slot. In many cases, when a mobile receives one of these messages, it remains awake and listens to all time slots within the superframe interval.

Figure 2A:
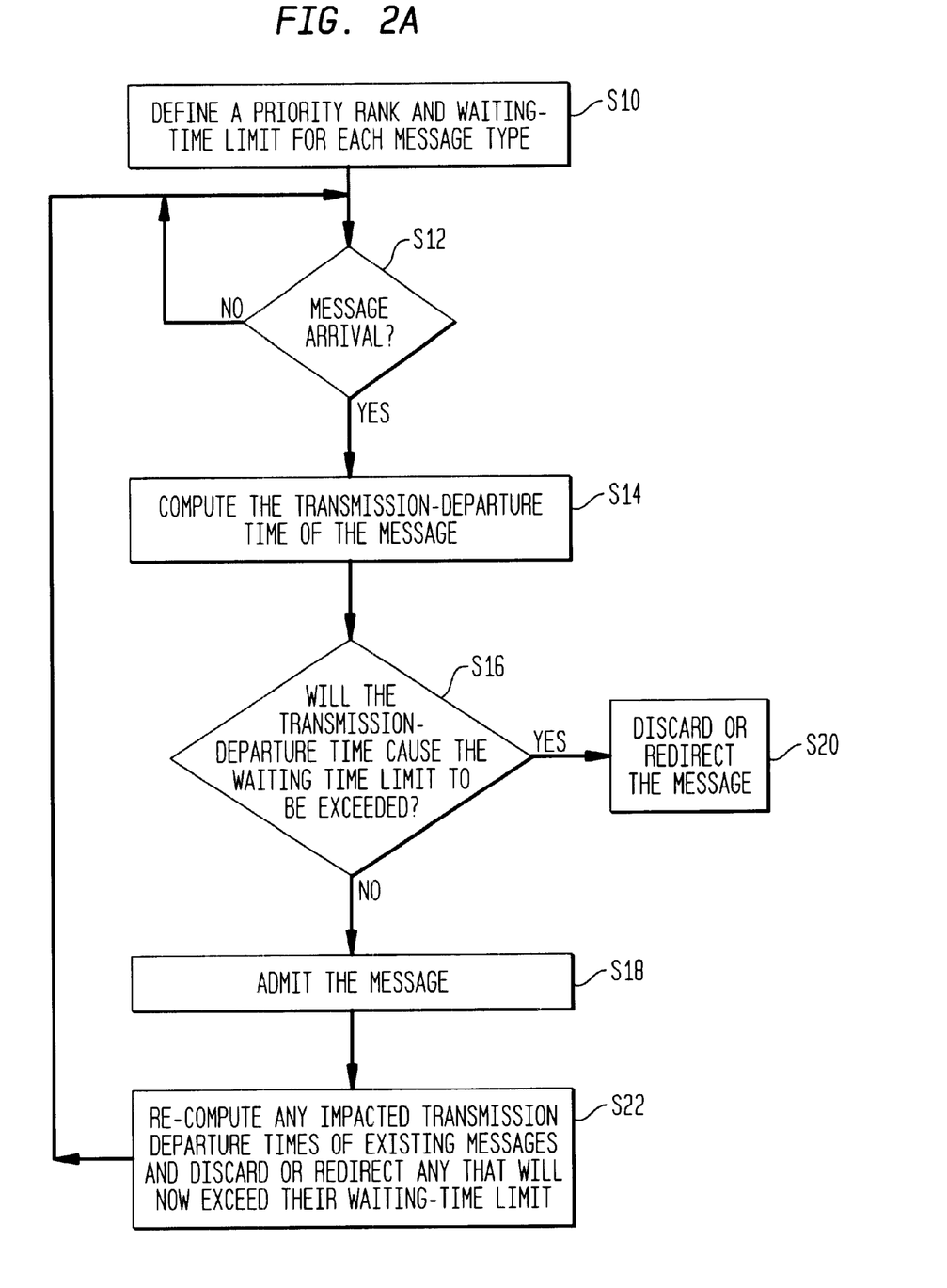
FIG. 2A is a flow chart of a zero-loss method for controlling admission of data messages to a communications node in accordance with the invention.

FIG. 2A illustrates operation of the overload controller 33 under a zero-loss approach to control the admission of receive data messages into the buffer memory 36 from the input 12 of the communications node 14 or at the holding memory 23. In general, a true zero-loss approach signifies that all receive data messages that can meet their time-out constraints are admitted to a communications node.

Starting in step S10, the communications node 14 defines or observes a priority rank and a waiting-time limit for each data message. The waiting-time limit refers to a maximum permitted latent duration, after which a stored data message is not ordinarily transmitted from the buffer memory 36, but deleted, overwritten, or displaced. The priority rank of a data message is preferably classified within a hierarchy of priority classes. Each message class may be associated with a corresponding queue. For example, a first message class may be organized to include paging messages; a second message class may be organized to include channel assignment messages.

Each priority class may contain one or more data messages with comparable admission value ratings. Within each priority class, each message has an intra-class admission rank to establish a priority ranking for the receive data messages allocated to an individual priority class. For example, the intra-class admission rank may represent an arrival time of arrival of each receive data message relative to the other data messages within the individual priority class.

The priority rank and the waiting-time limit may be defined so that all of the data messages within a class have a homogenous waiting-time limit and a homogeneous priority rank. However, within each class an intra-queue priority ranking may be organized such that the priority within each queue is first-in, first-out (FIFO). In an alternate embodiment, the intra-queue priority ranking may represent a last-in, first-out (LIFO) scheme, or any other suitable intra-queue priority ranking. The intra-queue priority ranking may be impacted by the transmission scheduling algorithm.

Although an admission value rating can be assessed in various ways, the primary technique is the potential of a particular receive data message to generate revenue for a service provider. For example, the overload controller 33 may assign a higher value rating to a first receive message representing a channel assignment than a second receive data message representing a paging request, regardless of the order of arrival of the first receive message and the second receive message at the communications node 14. In practice, the channel assignment nearly always results in a billable call-completion, whereas only a fractional number of paging messages, less than one, to mobile stations 20 result in a completed call. Mobile stations may be turned-off or out of range which leads to the lack of call completions originating from paging requests. Thus, channel assignments are considered more valuable than paging messages. Accordingly, the overload controller 33 may recognize a low priority class for paging data messages and one or more higher priority classes for channel assignment data messages.

Besides revenue generation potential, the admission value rating may be based upon a first-come, first-serve time priority technique, a waiting-time limit of the receive data message, a data packing constraint associated with transmission of the receive data message as a transmit data message, size of the receive data message, or by any other suitable technique. In one example, a data packing constraint may consider allocations of time slots in a frame or superframe to certain corresponding queues within the buffer memory 36. The foregoing allocations can impact data messages awaiting delivery in the queues. In another example, receive data messages of smaller size may be assigned a higher value rating than receive data messages of a larger size or longer length.

In step S12, the communications node detects if a data message has arrived at the holding memory 23 or at an input of the communications node 14. Until a data message arrives, the communications node 14 continues to detect if a data message has arrived. For example, if no message has arrived during a first iteration, the communications node checks again during a second iteration to detect if a data message has arrived.

If a data message has arrived at the holding memory, the method continues with step S14. In step S14, the overload controller 33 predicts (e.g., computes) a transmission-departure time of a receive data message from the output 16 upon reception of the receive data message at the input 12 of the communications node 14. The receive data message is evaluated in the holding memory 23 which provides a staging area for determining whether the receive data message should be admitted to the buffer memory 36. In step S14, the determination of the departure time considers data messages currently in the queues of the buffer memory 36, rather than data messages which have not yet arrived or may arrive. To accurately predict the transmission departure time, the overload controller 33 may assess the transmission time of currently queued or stored data packets, time slots, or frames from the output port 16 based on previously transmitted data packets, time slots, or frames, respectively. Step S14 preferably represents a global estimate of the transmission departure time that depends upon (1) the number of data messages in a local queue, (2) the number of data messages in higher priority queues than the local queue (3) amount of time required to transmit a current message being transmitted from the communications node or from both the communications node 14 and an associated base station system 18. An estimate of work to be done in storing and forwarded the data messages is represented by the data messages in front of each arriving data message at any given point in time.

The operation of a TDMA airlink is temporally deterministic in that time slots occur over the air interface of the base station system at regular intervals, periodic intervals, or at other predictable times. The deterministic nature of a TDMA air-interface may determine the timing of the transmit data messages at the output port 16 to the base station system 18. Thus, step S14 is readily executed for a communications node 14 used in conjunction with a time-division multiple access wireless communications system.

In step S16, the overload controller 33 determines whether or not the receive data message would remain stored within the communications node 14 for a latent duration longer than a waiting-time limit. The latent duration represents the time period from admittance of a receive data message to the buffer memory 36 to transmission from the output 16 based on the predicted transmission-departure time predicted in step S14. The waiting-time limit refers to a maximum permitted latent duration, after which a stored data message is not ordinarily transmitted from the buffer memory 36, but deleted, overwritten, or displaced. The waiting-time results from the throughput limitations of the communications node 14 for data messages or from the throughput limitations of downstream network elements, such as the base station system with its attendant air interface capacity limitations. Further, in step S16, the overload controller 33 may provide an indicator with a first state indicating that the latent period is greater than a waiting-time limit and a second state indicating the latent period is less than or equal to the waiting-time limit. Step S16 prepares the gatekeeper 30 for step S18 by indicating the result of a comparison of the predicted transmission departure time of step S14 to the relative time associated with the waiting-time limit.

On one hand, if, in step S16, the receive data message would not be transmitted prior to the expiration of the waiting-time limit, then after step S16, the method continues with step S20. In step S20, the gatekeeper 30 refuses to admit the receive data message for storage in the buffer memory 36. Accordingly, the gatekeeper 30 may delete or authorize deletion of the receive data message as is necessary. Alternately, the gatekeeper 30 may redirect the receive data message from the communications node 14, rather than deleting the receive data message.

On the other hand, if, in step S16, the receive data message would not remain stored within the buffer memory 36 of the communications node 14 for a latent duration longer than a waiting-time limit, then after step S16 the method continues with step S18 in which the data message is admitted from the holding memory 23 to the buffer memory 36.

In step S16, to determine if data messages would exceed their waiting-time limit, the communications node 14 estimates a transmission departure time with reference to a time-stamp associated with the data message. The time-stamp preferably indicates an initial arrival time when the arriving data message arrives at the holding memory 23. Further, the time-stamp provides a temporal reference for a subsequent comparison of the estimated transmission departure time to the actual transmission departure time for any updating of the prospective procedure of departure time estimation under analogous traffic conditions. Step S16 facilitates keeping the stale messages from blocking newer messages.

Following admission of the data message into the buffer memory 36 in step S18, in step S22 the communications node 14 recomputes any impacted transmission departure times of existing data messages and discards or redirects any that will now exceed their waiting-time limit. The impacted transmission departure times refer to each lower priority message, than the last admitted message in step S18, within one or more queues of the buffer memory. Higher priority data messages in the queues (22, 24) are not affected by the addition of the last admitted data message because the transmission time of the admitted data message and the waiting-time limit of the admitted message do not impact the transmission time of the higher priority data messages. In step S22, the estimated transmission departure time is updated or re-estimated at some actual current time after the time stamp.

For example, in step S22 the overload controller 33 evaluates the transmission-departure time of data messages waiting in one or more queues behind of the currently local queue, which is the queue that accepted the newly admitted message in step S18. The overload controller 33 doesn't need to calculate the transmission departure times of data messages waiting in higher priority queues because their transmission departure times are not affected by the newly admitted message. If a newly admitted data message in step S18 is placed at the end of the local queue, the newly admitted data message has no impact on the other data messages within the queue for a FIFO scheme. Thus, the overload controller 33 does not need to recompute the transmission-departure times of data messages in equal priority queues, but only data messages in lower priority queues. However, if an intra-queue priority scheme other than FIFO is used, transmission departure times for equal priority queues may need to be computed as well as transmission departure times for the lower priority queues.

Step S22 cooperates with step S14 to facilitate the zero-loss property of the algorithm of FIG. 2A. Step S22 simplifies the calculation in step S14 and ensures that buffer memory 36 is not wasted for data messages that will not meet their waiting-time limit based on the existing data messages in the buffer memory 36. Step S22 requires processing resources of sufficient data capacity and throughput within the communications node 14 for real-time execution of the zero-loss algorithm of FIG. 2A. For example, recomputing the impacted transmission departure time of existing data messages in step S22 could represent a recomputation for each lower priority message in the queues (22, 24). Because the admitted message is added in front of the lower priority messages in the queue, the estimated transmission time of the lower priority messages is lengthened by at least a transmit duration of the admitted data message. In contrast, because the admitted message is added behind the higher priority data messages in the queue, the estimated transmission time of the higher priority messages is not affected.

The recomputation in step S22 is stopped once the total estimated transmission duration of one or more deleted data messages (deleted from the buffer memory) equals or exceeds the estimated transmission duration of the newly admitted data message admitted in step S18. The estimated transmission duration refers to the time associated with the transmission process in which the communications node 14 outputs the data message over the output port 16 to the base station system 18. The downlink transmission process from the base station system 18 to the mobile station 20 generally impacts the estimated transmission duration.

In an alternate embodiment, the recomputation of step S22 is replaced with deleting one or more data messages having an estimated transmission duration equal to or exceeding the estimated transmission duration of a held data message to be admitted or a newly admitted data message admitted in step S18.

FIG. 2A makes efficient use of the buffer memory 36 and requires a minimum amount of buffer memory 36 to avoid losing data messages. Step S22 generally requires an examination of each lower priority queue and the local queue to assess the impact of admitting new arriving data messages. The local queue generally refers to a particular queue that was designated accept a data message or accepted an admitted data message based on priority rank of the data message. Accordingly, the processing capacity and throughput capability of the communications node 14 should be appropriately scaled to meet the intense computational requirements of step S22 to achieve a real-time admission procedure.

In accordance with the zero-loss method of FIG. 2A, if a data message has a transmission-departure time that is predicted to meet its waiting-time limit (i.e. time-out constraint), the data message is not deleted from the holding memory 23, but rather is admitted to the buffer memory 36. The storage of data messages in the buffer memory 36 or the queues becomes a linear function of the time-out thresholds. A true zero-loss priority scheme never rejects a data message that could have been transmitted within its waiting-time limit.

The zero-loss method of FIG. 2A operates on actual sample path and is not based on a traffic model. The sample path refers to an actual realization of a random system or a stochastic process. The zero-loss method produces reliable results regardless of actual traffic because the zero-loss method adapts to actual traffic conditions. For example, if traffic surges during peak busy hours, the zero-loss method discards or deletes more data messages consistent with steps S16 and S20 of FIG. 2A. The zero-loss method requires a total number of computations that are linearly based on the number of arrivals of data messages in the holding memory 23.

Each transmitted data message may be handled as few as three times. First, when or after the data message arrives at the input 12 or the holding memory 23 and the transmission-departure time is predicted. Second, when or after the decision is made whether or not to admit the held data message into the buffer memory 36 from the holding memory 23. Third, when the data message reaches the top or head of the queue (while the queue is being serviced). When the data message is handled, just a few comparisons and pointer operations are required. The computational rate is a linear function of the message rate, as opposed to an exponential function, such that the communications node 14 is readily equipped to provide real-time admission decisions on data messages arriving at the communications node 14.

In accordance with the method shown in FIG. 2A, admission is based only on the current queue contents of multiple queues in the buffer memory 36, ignoring the effect of future arrival of receive data messages at the input 12 of the communications node 14. Nevertheless, the actual transmission time of an earlier arriving message within its time constraint may be adversely affected by a later arriving, higher-priority, data message that, in effect, jumps into the queue in front of the earlier arriving data message. Thus, the later arriving data message may force or require the purging in S22 of a lower-priority message, such as the earlier arriving data message.

Figure 2B:
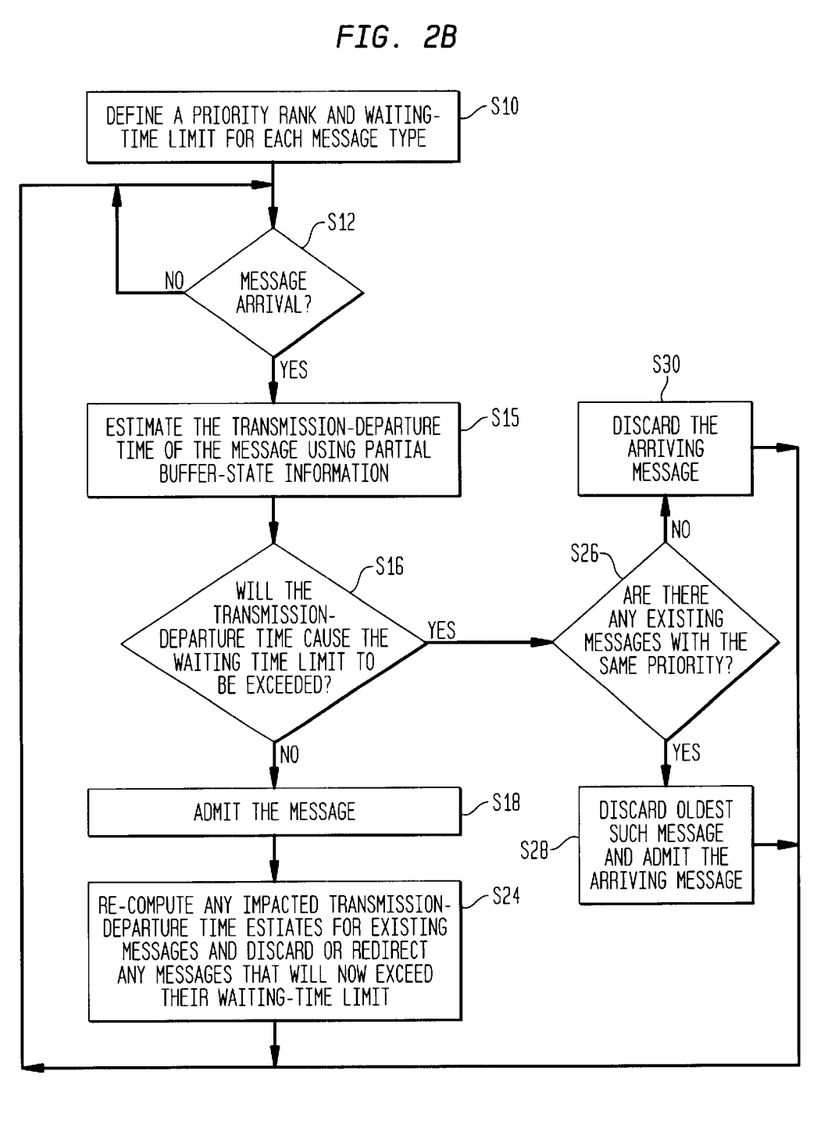
FIG. 2B is a flow chart of a variant zero-loss method for controlling admission of data messages to a communications node in accordance with the invention.

Because the computational cost of purging may be excessive or undesirable, under the aforementioned second procedure, the gatekeeper 30 may execute a variant of the above zero-loss algorithm that reduces or avoids purging as shown in FIG. 2B. Whereas the zero loss algorithm of FIG. 2A bases admission on the total length of equal-and-higher priority queues, the variant of the zero-loss algorithm of FIG. 2B considers only the length of the local queue to be assigned the arriving message. The zero-loss property is preserved in the variant algorithm, but the requirements for buffer memory 36 tend to increase over that of FIG. 2A to store some number of receive data messages that are admitted, but do not later meet their waiting-time limits. The variant of the algorithm increases the requirement for buffer memory 36, while reducing the computational load on the processing system 34 of the communications node 14. Like steps in FIG. 2A and FIG. 2B are indicated by like reference numerals.

Referring to FIG. 2B, when a data message arrives at the holding memory in step S12, the overload controller estimates the transmission departure-time of the data message using partial buffer state information. Partial buffer state information refers to a subset of all available buffer state information. In one example, partial buffer state information includes local queue. In another example, partial buffer state information includes the temporal impact of a local queue and a higher priority queue on the estimated transmission departure time of a held data message held in the holding memory.

Where the transmit departure time in step S15 is based only on the local queue into which the arriving message would be placed, the transmission-departure time of the local queue establishes a lower bound estimate of the transmission departure time that ignores higher priority queues. "Lower bound" means that the actual departure time may be longer because the actual departure time of the data message may be affected actually by one or more higher priority queues in the buffer memory 36.

Where the partial buffer state information in step S15 includes the local queue and a subset of higher priority queues, the subset of higher priority queues preferably includes the top priority queue. The top priority or highest priority queue may represent a bulk of the activity for the communications node 14. A lower priority queue than the local queue for accepting the data messages won't effect the waiting-time limit of a newly arrived message at the holding memory 23, so the lower priority queues are safely ignored without impacting the waiting-time limit.

Estimating the transmission departure time in step S15 involves looking at all data messages in front of (i.e., of higher priority than) the data message being evaluated for admission. For example, the sum of the waiting-time limit of the higher priority data messages than the held data message represents an initial estimate of the transmission departure time.

If an estimate of transmission departure time is based on evaluation of a local queue, a transmit duration of transmitting each higher priority message in the local queue is added to the foregoing initial estimate. The transmit duration measures how long until the transmitter finishes transmitting a particular data message or a group of data messages within the local queue.

After step S15 in step S16, the overload controller determines if the estimated transmission departure time of the held data message will cause the waiting-time limit to be exceeded. If the estimated transmission departure time would not cause the waiting-time limit to be exceeded, the held data message is admitted from the holding memory 23 into the buffer memory 36 in step S18.

If the estimated departure time would cause the waiting-time limit to be exceeded, the method continues with step S26. In step S26, the overload controller determines if any existing messages with the same priority rank, a lower priority rank, or both are in the buffer memory. The "no" path originating from S26 represents the conditions of no data messages being present in the local queue in the buffer memory 36.

In step S28, if an existing message with the same priority rank (as the held data message) is stored in the buffer memory 36, the overload controller 33 discards the oldest such data message and admits the arriving or held data message. Alternately, if an existing message with a lower priority rank (than the held data message) is stored in the buffer memory, the overload controller 33 discards the oldest data message of the lower priority rank and admits the arriving data message with the higher priority rank.

In accordance with a first-in, first-out scheme, the first message in a local queue is regarded as the oldest and new data messages are admitted to the end of the local queue. Step S28 may operate consistent with a FIFO scheme so that as a new message is admitted to the end of a local queue, while the first message in the queue is pushed out of the local queue, or otherwise discarded. If the local queue is full in step S28, one or more data messages of the same class priority may be discarded according to the oldest of the stored data messages. The messages may have different intra-queue priorities, even thorough the class priority ranks are identical.

In practice, step S28 may operate in the following manner, among others. Assume a first queue has a higher priority ranking than a second queue. Assume that the transmission scheduler is servicing the first queue, such that messages in the second queue become stale. Once the transmission scheduling of the first queue is completed, the overload controller discards one or more stale messages within the second queue. The stale messages may be identified in terms of the oldest data messages. Accordingly, the arriving data message may be admitted into the available space of the first queue or the second queue consistent with the priority of the arriving data message.

However, in step S26, if an existing message with the same priority or a lower priority than the held or arriving data message is not present in the buffer memory, the overload controller discards the held or arriving message in step S30.

As described above in step S18, the held data message is admitted from the holding memory 23 when the transmission-departure time causes the waiting time limit to be exceeded.

In step S24 following step S18 in FIG. 2B, the overload controller recomputes any impacted transmission-departure time estimates for existing messages and discards or redirects any messages that will now exceed their waiting-time limit. The recomputation is required because of admission of the data messages in step S18. Step S24 of FIG. 2B involves a reduced volume of computations compared to step S22 of FIG. 2A. Only partial buffer state information is used in step S24 to recompute the impacted transmission-departure time. Thus, the volume of the computations in accordance with step S24 is limited in at least two aspects. First, only impacted transmission times are recomputed, where "impacted" refers to transmission departure times whose associated partial buffer state information (in step S15 or otherwise) is altered by the admission of the arriving or held data message. For example, impacted may refer to queues of lower priority than the local queue for reception/storage of the admitted data message. If desired, the impacted queue may also include equivalent priority queues that are lower in intra-queue priority than the admitted data message. Second, the estimate of transmission-departure time uses only a local queue or a local queue and a subset of the higher priority queues to recompute the recomputed transmission departure time. The computational accuracy of step S24 is sometimes lower than that of step S22 because step S24 represents an estimate of the impacted departure time including at least one local queue, whereas step S22 includes consideration of substantially all higher priority queues than the local queue within the buffer memory as well as the local queue. The local queue refers to the queue to which the admitted message is admitted in step S18. In step S24, the recomputation preferably considers the same priority queues alone, rather than considering the lower priority queues, to reduce the complexity of the prediction of revised transmission-departure times. Under a special case where the used buffer state information only includes partial buffer state information associated with a local queue and where intra-queue priority is FIFO, then the computation in step S24 may be eliminated.

In both step S18 and step S28, the gatekeeper 30 preferably admits data messages into the buffer memory 36 if and only if they will be transmitted from the buffer memory 36 before expiration of their corresponding waiting-time limits. Prior to the expiration of the waiting-time limit means that the receive data message would remain stored within the communications node 14 for a latent duration less than a waiting-time limit.

After step S24 or S28, the admitted data message may be transmitted as a transmit data message from the output 16 prior to the expiration of the waiting-time limit. Finally, after transmission from the output 16, the admitted data message may be transmitted via the base station system 18 to the mobile station 20.

Both methods of FIG. 2A and FIG. 2B prevent the communications node from throwing away an arriving data message that could have been sent within its waiting-time limit. The method of FIG. 2A prevents the communications node from accepting a data message that actually is not sent within the waiting-time limit. The method of FIG. 2B generally features less computational complexity and requires more memory capacity of the buffer memory 36 than does the method of FIG. 2A. Because admission into the buffer memory 36 or queues may be based on local information, the overload control scheme may be independent of the general priority scheme of the scheduler. No adjustment is needed for alternating or state-dependent priority schemes. The overload control and transmission priority schemes can be modified independently.

This specification describes various embodiments of the method of the present invention. The scope of the claims is intended to cover various modifications and equivalent arrangements of the illustrative embodiments disclosed in the specification. Therefore, the following claims should be accorded the reasonable broadest interpretation to cover the modifications, equivalent structures, and features which are consistent with the spirit and the scope of the invention disclosed herein.

What is claimed is:

1. A method for controlling data flow in a store-and-forward communications node, the method comprising the steps of:

predicting a transmission-departure time of a receive data message from an output upon reception of the receive data message at an input of the communications node;

determining if the receive data message would remain stored within the communications node for a latent duration longer than a waiting-time limit based on the predicted transmission-departure time; and admitting the receive data message for storage in the buffer memory for prospective transmission over the output if the receive data message would be transmitted prior to expiration of the waiting-time limit.

2. The method according to claim 1 wherein the predicting step comprises considering data messages currently in a local queue defined by the buffer memory to determine the transmission-departure time.

3. The method according to claim 1 wherein the predicting step comprises considering data messages currently in a local queue defined by the buffer memory and data messages in higher priority class queues to determine the transmission-departure time.

4. The method according to claim 1 wherein the predicting step comprises considering data messages currently in a local queue defined by the buffer memory and data messages in a highest priority class queue to determine the transmission-departure time.

5. The method according to claim 1 further comprising the steps of
after admitting the receive data message, re-determining an impacted transmission-departure time associated with a corresponding existing data messages stored within the buffer memory;
discarding the existing data message if the impacted transmission-departure time exceeds its waiting-time limit.

6. The method according to claim 1 further comprising the steps of:
after admitting the receive data message, re-determining an impacted transmission-departure time for an existing data message stored within the buffer memory;
redirecting the existing data message if the impacted transmission-departure time exceeds its waiting-time limit.

7. The method according to claim 1 further comprising the step of:
after admitting the receive data message, re-determining an impacted transmission-departure time for an existing data message stored in a local queue that received the admitted receive data message.

8. The method according to claim 1 further comprising the step of:
after admitting the receive data message, re-determining an impacted transmission-departure time for an existing data message stored in a local queue that received the admitted receive data message and at least one lower priority queue within the buffer memory.

9. The method according to claim 1 further comprising the steps of:
deleting an oldest message within a local queue of the same priority as the receive data message if such an oldest message exists and if the transmission-departure time of the receive data message would exceed its waiting-time limit without the deletion;
admitting the receive data message into the local queue during or after deleting the oldest message.

10. The method according to claim 1 further comprising the step of: defining a priority rank for the receive data message.

11. The method according to claim 1 further comprising the step of:
prioritizing the transmission of the receive data messages as transmit data messages via the output independently from the admitting step.

12. A communications node comprising:
a holding memory for holding a receive data message;
an overload controller for predicting a transmission-departure time of the receive data message from an output upon reception of the receive data message at the holding memory;
a buffer memory coupled to the holding memory for storing the receive data messages associated with a corresponding waiting-time limit;
a gatekeeper for admitting the receive data message for storage in the buffer memory for prospective transmission over the output if the receive data message would be transmitted prior to expiration of the waiting-time limit.

13. The communications node according to claim 12 wherein the buffer memory is organized into a local queue, and wherein the gatekeeper admits the receive data message to the local queue based on a transmission-departure time determined with reference to contents of the local queue.

14. The communications node according to claim 12 wherein the buffer memory is organized into a local queue and higher priority class queues, and wherein the gatekeeper admits the receive data message to the local queue based on a transmission-departure time determined with reference to contents of the local queue and the higher priority class queues.

15. The communications node according to claim 12 wherein the buffer memory is organized into a local queue and a highest priority class queue, and wherein the gatekeeper admits the receive data message to the local queue based on a transmission-departure time determined with reference to contents of the local queue and the highest priority class queue.

* * * * *